United States Patent
Connor et al.

(10) Patent No.: US 7,454,641 B2
(45) Date of Patent: Nov. 18, 2008

(54) SYSTEM POWERED FROM A LOCAL AREA NETWORK CABLE

(75) Inventors: Patrick Connor, Portland, OR (US); Scott P. Dubal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 11/241,608

(22) Filed: Sep. 30, 2005

(65) Prior Publication Data

US 2007/0079151 A1     Apr. 5, 2007

(51) Int. Cl.
*H02J 3/02* (2006.01)
(52) U.S. Cl. .................. 713/324; 713/300; 713/310; 713/320; 713/321; 713/322; 713/323; 713/330; 713/340
(58) Field of Classification Search ............... 713/300, 713/310, 320–324, 330, 340
See application file for complete search history.

(56) References Cited

U.S. PATENT DOCUMENTS

| 5,729,431 | A  | * | 3/1998  | Marwah et al. | ............ | 361/687 |
| 2004/0232768 | A1 | * | 11/2004 | Hung et al.   | ............ | 307/3   |
| 2006/0197387 | A1 | * | 9/2006  | Hung et al.   | ............ | 307/140 |

OTHER PUBLICATIONS

Intel Manual, "82573E and 82573V Gigabit Ethernet Controllers" Network Silicon, Datasheet, Intel Corporation—Revision 1.5, Jun. 2005 (pp. i-iv; and 1-37).
Intel Product Brief, "Intel 82573E and 82573V Gigabit Ethernet Controllers—High-Performance Gigabit Network Connectivity with Intel Management Technology", Intel Pro Network Connections (Copyright 2005 Intel Corporation) (4 pages).
Intel Technology Brief, "Intel Active Management Technology—New capabilities for improving IT platform management efficiency", Intel Active Management Technology (Copyright 2005 Intel Corporation) (4 pages).
DSP Design Internet catalog "Products—Power Over Ethernet—POET6000 Flat Panel Computers", DSP Design Ltd., Chesterfield, United Kingdom (www.dspdesign.com) (3 pages), Apr. 24, 2005.
www.PowerOverEthernet.com, "IEEE 802.3af Power Over Ethernet: A Radical New Technology", IEEE Standards Board Jun. 12, 2003 (pp. 1-10).
Power Over Ethernet, "Quick Guide to Power Over Ethernet Technology", PowerOverEthernet.com Staff Apr. 27, 2005 (1 page).

* cited by examiner

*Primary Examiner*—Abdelmoniem Elamin
(74) *Attorney, Agent, or Firm*—Blakely, Sokoloff, Taylor & Zafman LLP

(57) ABSTRACT

A system has a power consuming component, power source circuitry, and power control circuitry. The power source circuitry is to supply power from a number of different sources, including some extracted from a local area network (LAN) cable that is attached to the system. The power control circuitry is to supply the power to operate the component from all of the different sources.

19 Claims, 4 Drawing Sheets

SYSTEM POWERED FROM A LOCAL AREA NETWORK CABLE

An embodiment of the invention is directed to supplying power to a mobile system, and to a network interface, from a local area network (LAN) cable that is attached to the system. Other embodiments are also described and claimed.

BACKGROUND

Modern mobile computing systems such as personal computer notebooks and hand-held e-mail retrieval devices are being provided with increasing functionality and performance. Most personal computer notebooks are being shipped with built in wireless data networking capabilities, as well as relatively large display screens, increased storage, and greater processor performance. In addition, in roads have been made into improving battery life by a combination of power consumption reduction techniques and rechargeable batteries having greater energy density.

Nevertheless, mobile systems are still restricted by their relatively high power requirements. Their batteries often need to be recharged, typically by plugging into an AC wall outlet. Despite the advances in power management and battery technology, most notebooks under typical usage have a battery life of no more than three or four hours. In the case of an all day meeting however, a fully charged, spare battery pack will be necessary to power the system for the duration of the meeting. As an alternative, the system must be plugged into a wall outlet via its corresponding AC adapter and power cable. Thus, with most modern notebooks, the user will need to bring either the AC adapter or a charged, spare battery, else he may need to use the system very conservatively to preserve battery life.

In another field, a modern computing system (be it for example a server or a desktop personal computer) has a network interface that allows a host processor in the system or machine to communicate with other nodes as part of a computer network. The network interface includes a network controller integrated circuit device that communicates, either via wireless connection or via a cable (such as an Ethernet cable) with the other nodes. Modern network interfaces are being enhanced with management capability. The management capability allows the interface, in concert with a remote node, to be used to discover, heal and protect the system, even while the system is powered off. For example, there is the capability to monitor environmental sensors in the machine, and signal an alert to a remote node if for example a component of the machine is overheating. The network management capability may also include wake-up filters that monitor incoming packets from the network and upon detecting certain predefined information in these packets alert the host processor. This allows the machine to enter a low power consumption mode (e.g., a sleep mode) while still being in touch with the network.

The network interface and the rest of the machine is typically powered by the machine's primary power supply circuits. In the event primary power is down, a backup source such as an uninterruptable power supply (UPS) used with desktop and sever computers, may automatically activate itself to supply the needed power. If the machine is a mobile system, however, powering the network interface with the AC adapter disconnected will eventually drain the mobile system's rechargeable battery.

More recently, Power Over Ethernet technology has emerged that allows computing appliances such as internet protocol (IP) telephones, wireless local area network (LAN) access points, and Web cameras to receive power as well as data, over existing LAN cabling. In a familiar example, conventional telephone sets are powered from the telephone exchange through the same twisted pair that carries voice. Now, Ethernet devices such as IP telephones and Web cameras can be powered over the same LAN cable through which they communicate. A UPS connected to an Ethernet switch or a Power Over Ethernet mid span hub (in a network equipment cabinet), helps guarantee power to the appliance, even during main power failure.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
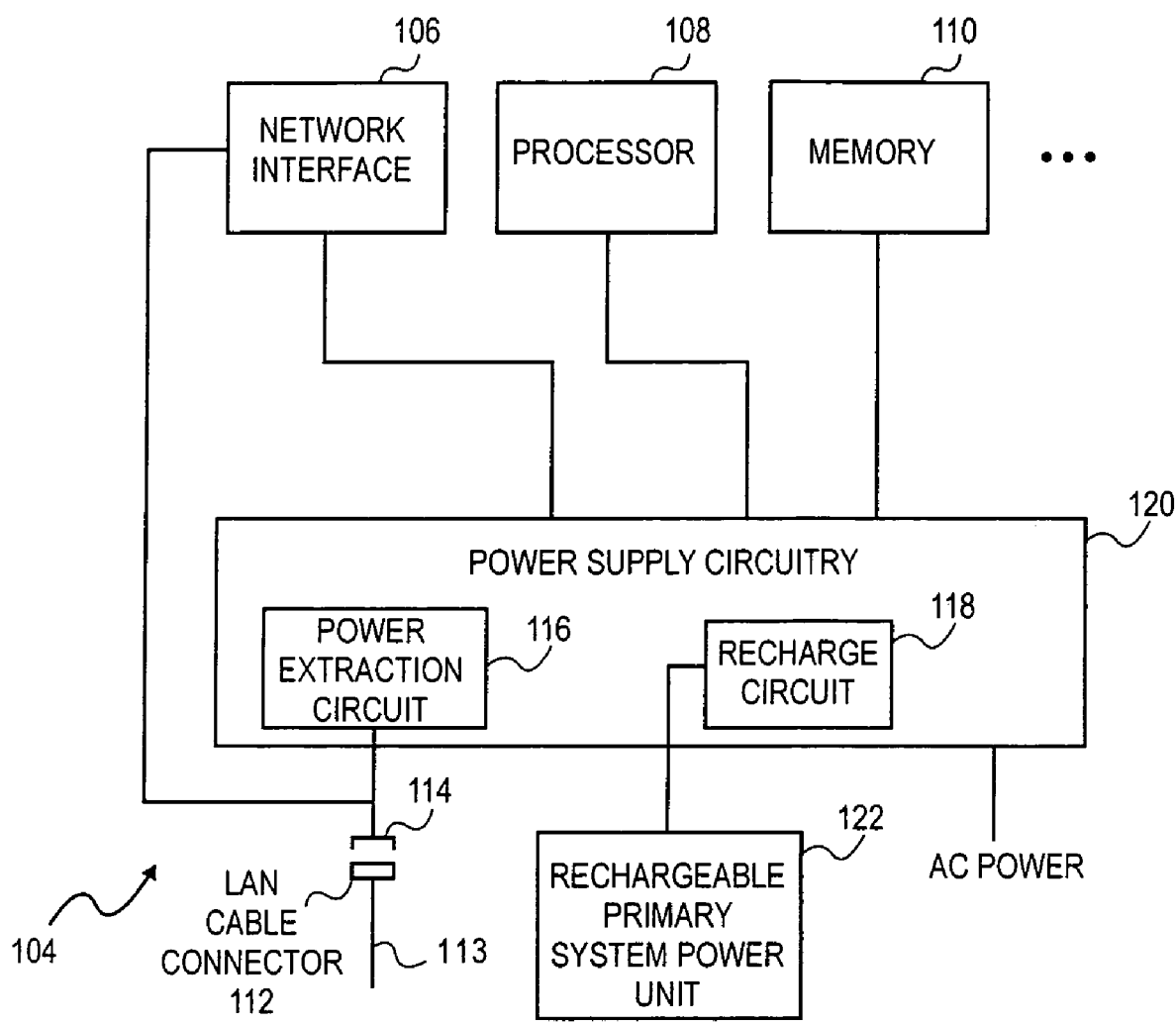
FIG. 1 is a block diagram of a computing system that can obtain power from a LAN cable, according to an embodiment of the invention.

FIG. 1 is a block diagram of a computing system or machine that can obtain power from a LAN cable, according to an embodiment of the invention. The system 104 has a number of constituent components. These components include integrated circuit devices such as a network controller that is part of a network interface 106, processor 108, and memory 110. Additional devices may also be present, including for example a system chip set (e.g., a graphics and memory controller hub, GMCH, by Intel Corp. of Santa Clara, Calif.) and an I/O hub. The latter two devices may sometimes be referred to as a north bridge and a south bridge, of a server machine or a home desktop computer.

The memory 110 may be composed of entirely dynamic random access memory (DRAM), or it may be a combination of DRAM and nonvolatile memory such as a solid state "disk". The memory 110 is to store an operating system program (e.g., a desktop operating system program; an embedded operating system program) and any application programs that will be executed by the processor 108. Such software may use the machine to communicate with another node of a computer network, through a network communications protocol stack and the network interface 106. Communications with other nodes occurs via a LAN cable connector 112 that can be plugged in by a user into a mating connector or socket 114 of the system 104.

The LAN cable connector 112 and its attached cable 113, in addition to providing access to a guided wave transmission medium for data communications, provides for the transmission of power. For example, the cable connector 112 and cable 113 may be used in accordance with Power Over Ethernet technology. That technology specifies that DC power may be applied to the spare pairs, or to the signal/data pairs of a CAT5 Ethernet cable. Such a cable has a bundle of four, twisted wire pairs, two of which are used for the data and two of which are spare. Other ways of defining how DC power may be transmitted over a LAN cable, and then extracted from the LAN cable connector 112, are acceptable.

The components of the system 104 also include a power extraction circuit 116 and a recharge circuit 118. The power extraction circuit 116 serves to draw power from the attached LAN cable 113 and connector 112, to power the components of the system 104. According to an embodiment of the invention, the power extraction circuit 116 is a part of power supply circuitry 120 that powers a part, and not all of the system 104. For example, the part of the system that is powered from the LAN cable connector may include the network interface 106, but exclude one or more other components of the system. In another embodiment, power drawn from the LAN cable 113 and connector 112 is fed to a recharge circuit 118 (e.g., while AC power to the system is not available). The recharge circuit 118 serves to recharge a primary system power unit 122 (e.g., a nickel metal hydride rechargeable battery). The primary system power unit 122 can power the entire system, while primary AC power to the system is not available. This is in contrast to a backup power unit, such as a UPS, which is an auxiliary or backup source of AC power to the system. The primary AC power in this case may be that which is obtained from a household, AC wall outlet (also referred to as AC mains voltage or AC mains line).

The power supply circuitry 120 is able to power a part and not all of the system, from power drawn from the LAN cable 113, as an auxiliary power source. The system may be a desktop computer, so that the rechargeable, primary system power unit 122 and its associated recharge circuit 118 would be absent from the machine. This system may have been unplugged from AC power, or has otherwise lost AC power (and no backup UPS power is available). In that case, auxiliary power drawn from the LAN cable 113 would be fed to operate networking technologies in the network interface 106, without using the primary power source. As an alternative, the processor 108 may have been placed into a sleep mode to conserve power, yet the network interface 106 would still be powered by the LAN cable 113 to maintain the ability to detect incoming network packets and wake up the processor in response to certain information being detected in the received packets. In addition, management alerts could still be sent by the network interface 106 (to remote, network nodes), to report that the system had lost primary power.

In the case of a mobile system, if AC power is not available (e.g., an AC adapter is not plugged in), the power supply circuitry 120 could divert power from the power extraction circuit 116 to the recharge circuit 118 (assuming of course that the system is attached to the network by way of the LAN cable 113). That allows the power unit 122 to be recharged, while the system is not plugged into any other power source. An example of such a situation is when a user attends a relatively long meeting of more than several hours, with her notebook computer running and attached to a Power over Ethernet wall socket. Her notebook's battery may thus be recharged, without having brought the corresponding AC adapter and power cable for her machine to do so. With the power supply circuitry 120 integrated in her mobile system, and automatically diverting power from the LAN cable to recharge the battery, the user can in many instances do without her AC adapter kit thereby rendering her mobile system much more convenient to use while traveling.

In another scenario, assume that the mobile system is being powered, in its active mode of operation, from the rechargeable primary system power unit (and is not plugged into AC power). The system may be then be placed into a sleep mode, while being powered from the rechargeable power unit. For example, its host processor may be placed into a sleep mode, following expiration of an idle timer. Thereafter, while the system is in sleep mode, the power supply circuitry 120 draws power from the LAN cable 113 to only those parts of the system that are expected to consume the most power during sleep mode. This helps preserve the life of the battery, by for example powering the network interface only from Power Over Ethernet. That will allow the network interface to continue monitoring incoming packets and perform other management functions which would otherwise drain the primary battery of the system.

It should be noted that there may be several different levels of sleep mode into which a system can be placed. Many of these may correspond to the different levels of sleep associated with a host processor, including for example a deeper sleep mode in which additional functionality of the processor is either disabled or simply powered down when not expected to be in use.

Figure 2:
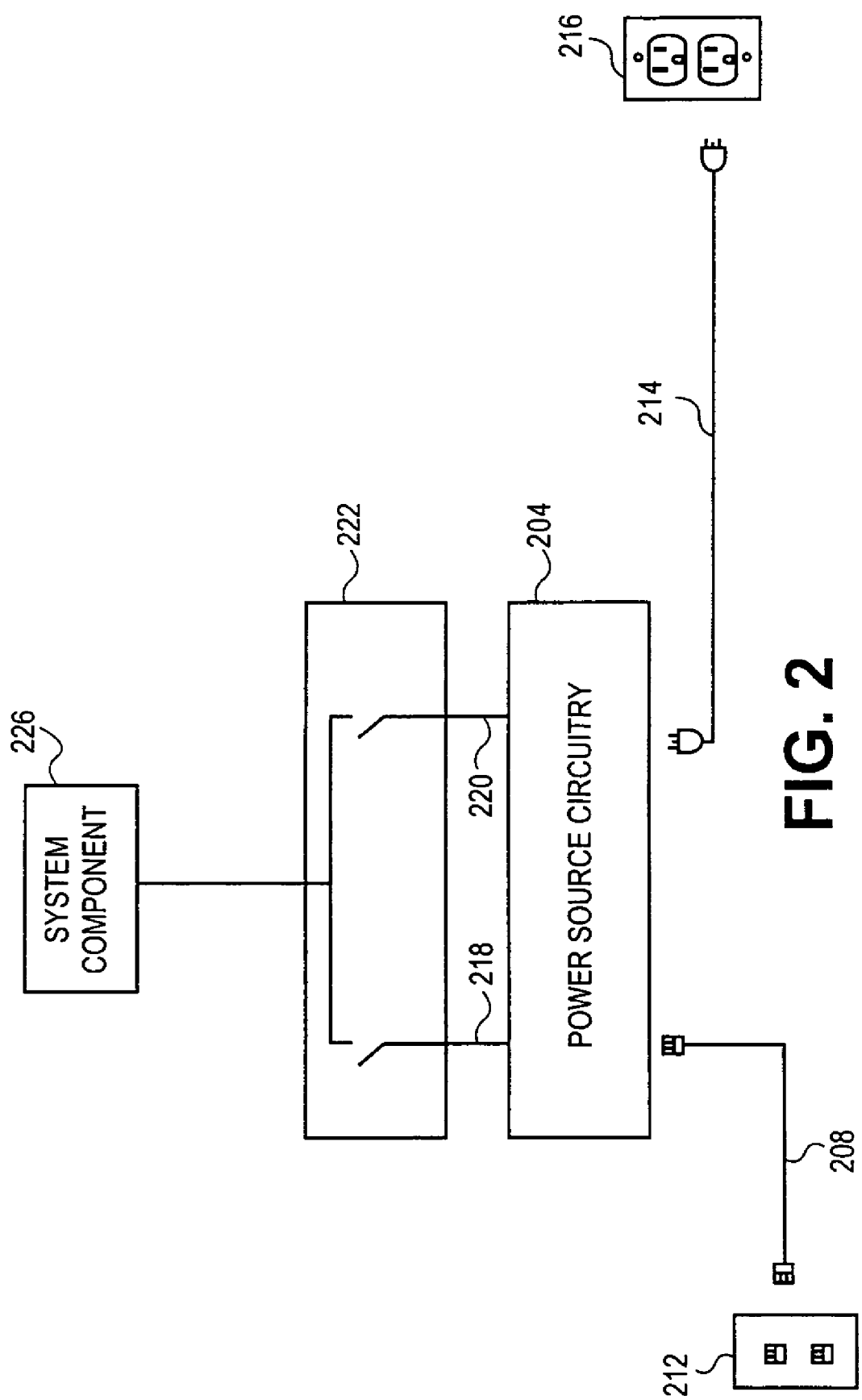
FIG. 2 is a block diagram of another embodiment of the invention, as a system having power source circuitry that provides power from different sources.

Turning now to FIG. 2, a block diagram of another embodiment of the invention is shown, as a system having power source circuitry 204 that can provide power from two or more different sources, to the same system component 226. Power source circuitry 204 may include magnetics and other power electronics circuitry, to provide power from a number of different sources including some extracted from a LAN cable 208 that is attached to the system at one end and to a network wall outlet 212 at the other. The connectors at either end of the cable 208 may be RJ-45 type connectors, as called for in Power Over Ethernet technology. Other types of LAN cabling and connectors may alternatively be used that can provide the DC power in the same bundle as the network data signal.

At least one other power source is coupled to the power source circuitry 204, including AC power drawn from in this example an AC wall outlet 216, by way of a AC power cable 214. The power source circuitry 204 may operate to provide independent DC voltages at two separate outputs 218, 220. These outputs feed power control circuitry 222 which acts as a multiplexer to select DC power from only one of the outputs 218, 220. The selected power is routed to operate the system component 226.

The system component 226 may be an integrated circuit device or it may be a combination of circuitry and mechanical devices such as a cooling fan integrated in the system, to help cool high performance integrated circuit devices, such as a processor. The system shown in FIG. 2 may be a desktop or a server machine that may have been unplugged from the AC wall outlet 216 and, with the absence of a UPS in series between the wall outlet 216 and the power source circuitry 204, is left with the only power in the system being that which is extracted from the LAN cable 208. The power control circuitry 222 in that case disconnects the output 220, and connects output 218 to feed auxiliary power to the system component 226 (extracting power from the LAN cable 208). According to an embodiment of the invention, the system component 226 is a network interface that includes for example a network controller integrated circuit, e.g., an Ethernet media access controller and physical layer transceiver (MAC and PHY) for client networking applications.

Figure 3:
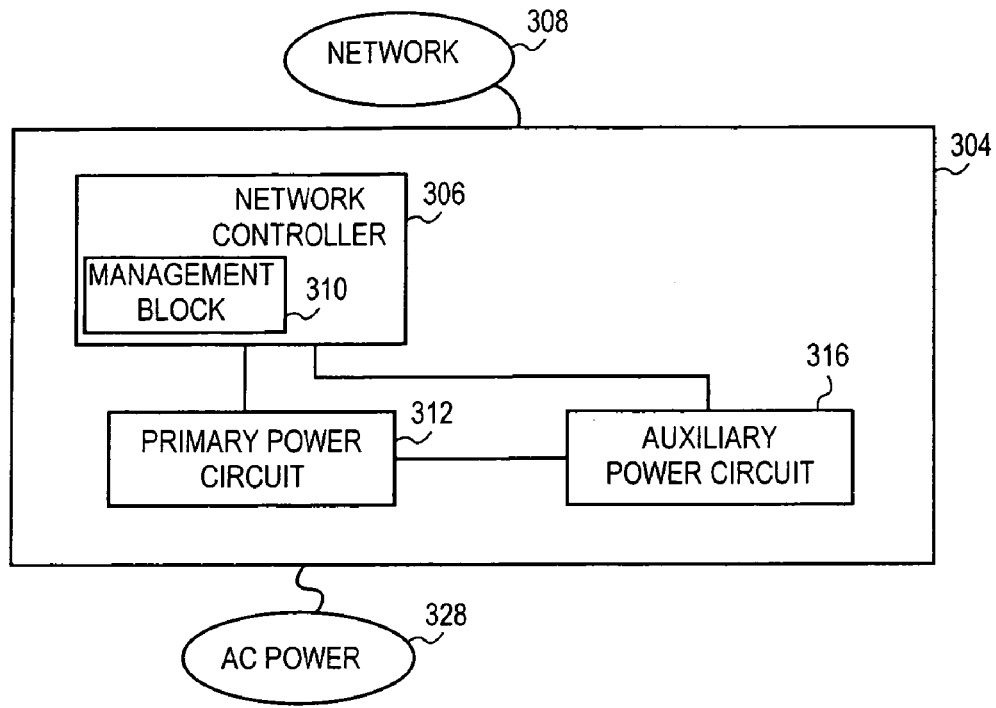
FIG. 3 is a block diagram of a system having primary and auxiliary power circuits.

Turning now to FIG. 3, a block diagram of a system having primary and auxiliary power circuits that feed a network controller is shown. The system 304 may have a processor and memory (not shown) that communicate with a network controller 306 to run client networking applications (e.g., web browsers). The network controller 306 is part of a network interface to which a LAN cable connector (not shown) is to be attached, for communications with other nodes in a data network 308. The network controller 306 has a management block 310 that performs the functions a network management protocol, such as the Intelligent Platform Management Interface (IPMI) which is an abstracted, message-based interface to intelligent platform management hardware that is typically in a server machine. These protocols describe how a management block of a network controller communicates with sensors and other control circuitry that are installed on the baseboard or motherboard of a computer system, or on another printed circuit board in the same chassis as the baseboard, to monitor the health and security of the system and report to a remote node over a network. The network management protocol may be one that complies with the proprietary, INTEL Active Management Technology which allows the information technology administration department of an institution to discover the assets of client machines even while they are powered off, "heal" the client systems with out-of-band management capabilities (after an operating system failure), and protect the client systems by updating virus protection software consistently across the enterprise. Yet another network management capability is the Alert Standard Format (ASF) which defines interfaces that provide access and manageability in operating system-absent environments.

Referring back to FIG. 3, the primary power circuit 312 powers the network controller 306 in its normal or active mode of operation, from for example AC power source 328. The output of the primary power circuit 312 may be at a relatively high supply voltage, compared to the output of the auxiliary power circuit 316. The latter extracts power from an attached, LAN cable connector (not shown) that is used to communicate with the network 308. The auxiliary power circuit 316, and not the primary power circuit 312, powers the network controller 306, during failure of primary power. In that case, the network controller 306 may be powered from the attached LAN cable connector, while the rest of the system 304 is running off a rechargeable power unit that is coupled to power the memory and host processor of the system (not shown) as a primary power source (in contrast to a backup power source, such as a UPS.)

Figure 4:
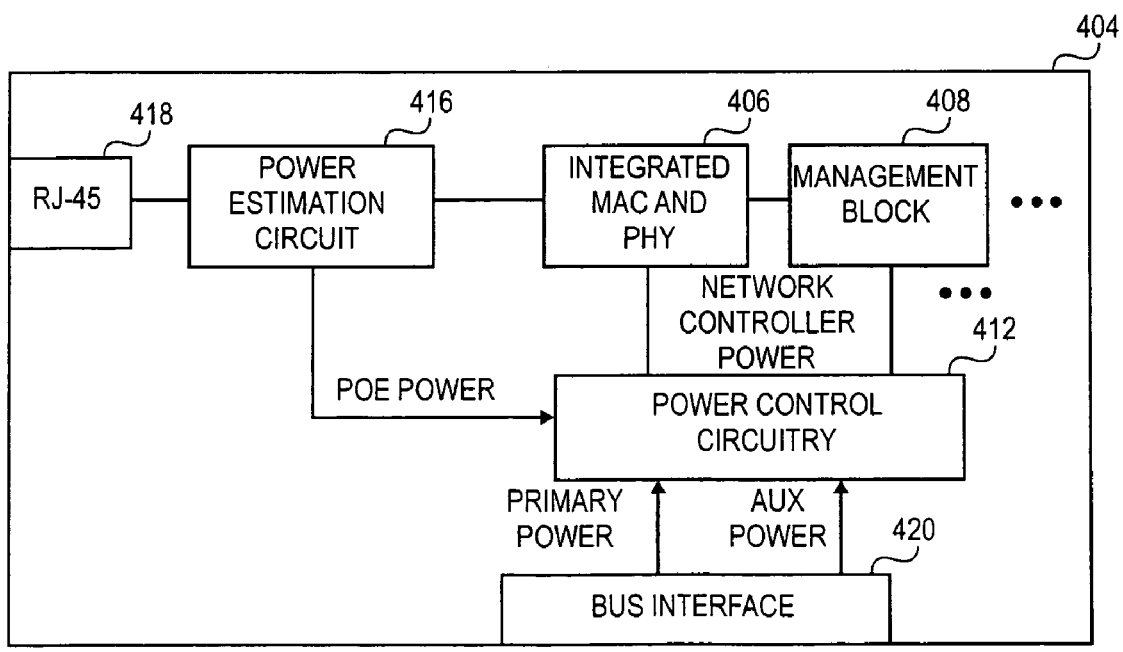
FIG. 4 is a diagram of a network interface card or LAN on motherboard component of a system with Power Over Ethernet capability.

Referring now to FIG. 4, a diagram of a network interface card or LAN on motherboard component of the system is shown, having Power Over Ethernet capability. The component 404 includes network controller components, namely integrated MAC and PHY circuitry 406, management block 408, as well as others not shown. Power to the network controller is provided by power control circuitry 412 that is capable of drawing this power from in this case three different sources, namely Power Over Ethernet, a primary source, and an auxiliary source. The Power Over Ethernet is extracted by a power extraction circuit 416 from a LAN cable connector that plugs into an RJ-45 connector or socket 418. Primary power and auxiliary power come into the component 404 over a bus interface 420. The bus interface 420 is to be attached to data and power lines that are in a printed wiring board of the system, referred to as a baseboard or motherboard (not shown). Some or all of the elements in the component 404 may be integrated in a system chip set (e.g., an I/O hub). As an alternative, some or all of the elements may be in a separate, dedicated network controller integrated circuit package that is installed on the motherboard, or on a network interface card (an add-in card or adapter card that is inserted into a connector slot on the motherboard or baseboard). In that case, the power extraction circuit 416, the connector or socket 418, the power control circuitry 412, and the bus interface 420 may be separate from the network controller integrated circuit but installed on the same network interface card. This embodiment may not require any modification to the baseboard functions, or to the network controller's MAC and PHY, making it an easy upgrade to existing systems.

Figure 5:
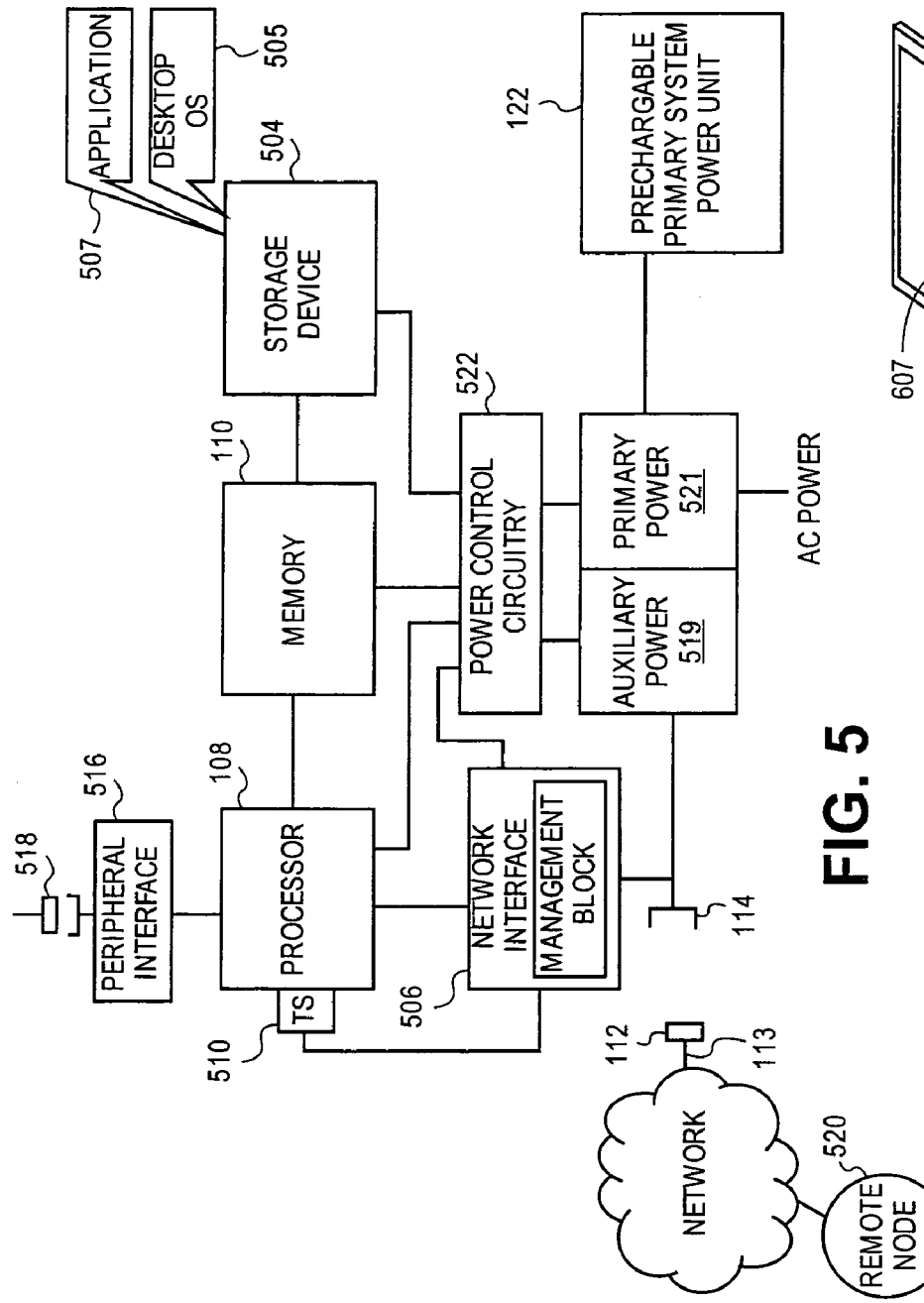
FIG. 5 is a block diagram of a mobile personal computing system with auxiliary power extracted from a LAN cable.

Referring now to FIG. 5, a block diagram of a mobile personal computing system with auxiliary power extracted from a LAN cable connector is shown. This system has a processor 108 coupled to a memory 110 (see FIG. 1). In addition, a storage device 504 provides nonvolatile storage of software to be executed by the processor including a desktop operating system 505 and an application program 507 running on top of the operating system. The storage device 504 may include a solid state disk, a rotating magnetic disk drive, or other nonvolatile mass storage device. The processor 108 is to load and execute the operating system and application programs from memory 110. The reference to a "desktop" operating system is not limited to programs that run only on a desktop computer, but can also be an operating system program that is installed into a notebook computer. This is in contrast to an "embedded" operating system program.

The system also includes a network interface 506 to which a LAN cable connector 112 (see FIG. 1) is to be attached. The network interface has a management block that is to receive temperature information from a thermal sensor 510 that in this example is installed to sense an operating temperature of the processor 108. The management block will signal an alert to a remote network node 520, via the LAN connector or socket 114, LAN cable connector 112 and LAN cable 113, should the temperature information indicate that the processor is overheating.

The system also has a peripheral interface 516 to which a peripheral bus cable connector 518 is to be attached. The peripheral interface 516 may include I/O hub integrated circuits and connectors that enable the processor 108 to communicate with peripheral devices that are external to the mobile system (e.g., digital cameras and printers).

The system depicted in FIG. 5 has a primary power circuit 521 that supplies power to the different components in the system, from either AC power or a rechargeable primary system power unit 122 (see FIG. 1). An auxiliary power circuit 519 in this case draws power from the network socket 114, the LAN cable connector 112, and LAN cable 113 that is attached to that socket. Power control circuitry 622 feeds the drawn power to operate the different components of the system indicated in the figure, including the network interface, processor 108, memory 110, and storage device 504.

According to an embodiment of the invention, the circuitry 522 is to feed the auxiliary power drawn from the LAN cable connectors 112, 114, to power the operation of a portion, and not all of the system, while another portion of the system is running off the rechargeable power unit 122. For example, part of the network interface 506, including the management block, may be running off the auxiliary power extracted from the attached LAN cable connector 112, while the rest of the system is running off the primary system power unit 122 (with the system being unplugged from AC power). This helps reduce the rate at which the power unit is 122 is being drained.

Figure 6:
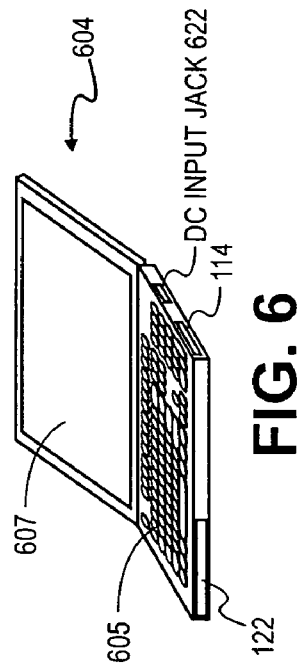
FIG. 6 is an elevation view of a notebook computer with built in Power Over Ethernet capability.

In FIG. 6, an elevation view of a notebook computer with built in Power Over Ethernet capability is shown. The notebook computer 604 has a chassis in which a first panel 605 is hinged to a second panel 507, where the panels can rotate relative to each other into a closed, abutting position. In the open position shown in the figure, a display can be seen in the second panel 607 while a keyboard is in the first panel 605. The display and the keyboard are coupled to the processor 108 (see FIG. 5). All of the components shown in FIG. 5 that are part of the system are integrated into the chassis of FIG. 6 including power extraction circuitry (not show but implied as part of auxiliary power circuit 519). The connector or socket 114 in this instance is an RJ-45 port. As to the primary power circuit 521, although it extracts power from an AC power source, it does so indirectly, via an AC adapter (not shown). Accordingly, the notebook 604 in FIG. 6 is fitted with a DC input jack 622 that mates with a corresponding plug which is typically at the end of a cable that is attached to an AC adapter (not shown). Other indirect means of drawing AC power from an AC mains line are possible.

The invention is not limited to the specific embodiments described above. For example, referring to FIG. 2 in which power source circuitry 204 is shown as being attached to a LAN cable 208 and a power cable 214, the attachment mechanism may be a hard wired, permanent one, or it may be a detachable connector/socket pair for each cable (the latter case of course being used in a mobile system). Accordingly, other embodiments are within the scope of the claims.

What is claimed is:

1. A method comprising:
   powering a system including a plurality of components of the system, by a primary power source; and
   powering a part and not all of the system, including some, and not all, of the plurality of components, from power drawn via a local area network (LAN) cable that is attached to the system, wherein the part of the system that is powered from the LAN cable consists of a network interface.

2. The method of claim 1 wherein said powering from the LAN cable occurs only while the primary power source is not available to power the plurality of components of the system.

3. The method of claim 1 wherein the system is powered, during an active mode of operation, from a rechargeable primary system power unit and not an AC power source, the method further comprising:
   putting the system into a sleep mode of operation while powered from the rechargeable power unit,
   wherein powering said part and not all of the system, from the local area network (LAN) cable that is attached to the system, occurs during said sleep mode.

4. The method of claim 3 further comprising putting the system into a deeper sleep mode of operation, and
   while the system is in said deeper sleep mode, powering said part, and not all, of the system from the local area network (LAN) cable that is attached to the system.

5. A system comprising:
   a network controller;
   power source circuitry to provide power from a plurality of different sources that include a rechargeable primary system power unit, including some extracted from a local area network (LAN) cable attached to the system; and
   power control circuitry coupled to the power source circuitry and the network controller, to power the network controller from the attached LAN cable while the rest of the system is running off the rechargeable primary system power unit.

6. The system of claim 5 wherein the power source circuitry is to provide power from an AC wall outlet.

7. A system comprising:
   a memory;
   a processor coupled to the memory;
   a rechargeable power unit coupled to power the memory and processor as a primary power source; and
   a network interface to which a local area network (LAN) cable is to be attached, the processor being coupled to the network interface;
   power extraction circuitry to draw power from the LAN cable as an auxiliary power source; and
   power control circuitry coupled to the power extraction circuitry to feed the drawn power to power only the network interface of the system while the rest of the system is running off the rechargeable, power unit.

8. The system of claim 7 further comprising:
   a display and a keyboard coupled to the processor; and
   a chassis having a first panel hinged to a second panel, wherein the keyboard is in the first panel and the display is in the second panel, and wherein the memory, processor, rechargeable power unit, network interface and power extraction circuitry are integrated into the chassis.

9. The system of claim 7 further comprising a peripheral interface to which a peripheral bus cable connector is to be attached, the processor coupled to the peripheral interface.

10. The system of claim 7 wherein the network interface has a network controller with a management block, wherein the management block is to filter incoming packets from the LAN cable and signal an alert to wake up the processor.

11. The system of claim 10 wherein the drawn power is to power the management block during a system sleep mode of operation while another portion of the system is running off the rechargeable, system power unit.

12. The system of claim 7 further comprising a thermal sensor coupled to the network interface, and wherein the network interface has a management block to receive temperature information from the thermal sensor and signal an alert to a remote network node via the LAN cable.

13. The system of claim 7 further comprising a storage device to store a desktop computer operating system program and an application program, the processor to load and execute the programs from said memory.

14. The system of claim 13 further comprising:
   a keyboard coupled to the processor; and
   a chassis, wherein the keyboard, storage device, memory, processor, rechargeable power unit, network interface and power extraction circuitry are integrated into the chassis.

15. The system of claim 7 wherein the network interface comprises a network interface controller integrated circuit device coupled to a connector that mates with a LAN cable connector.

16. The system of claim 14 wherein the integrated circuit device is integrated in a system chipset for the system.

17. A system component, comprising:
   a network controller to send and receive packets via a LAN cable connector, the network controller having a management block;
   a power extraction circuit to extract power from the LAN cable connector; and
   power control circuitry to receive auxiliary power from the extraction circuit and primary power from an interface to a baseboard bus, and being coupled to power the management block with the received auxiliary power and the rest of the network controller with the received primary power.

18. The system component of claim 17 wherein the network controller comprises a media access control (MAC) layer block, a physical layer block to interface with the LAN cable connector, and a management block all coupled to receive power from the power control circuitry.

19. The system component of claim 18 wherein the network controller, power extraction circuit and power control circuitry are on a network interface card together with the LAN cable connector and the baseboard bus interface.

* * * * *